United States Patent
Tian

(10) Patent No.: US 10,296,140 B2
(45) Date of Patent: May 21, 2019

(54) INFORMATION PROCESSING METHOD FOR AVOIDANCE OF A MIS-TOUCH AND ELECTRONIC DEVICE THEREOF

(71) Applicant: Lenovo (Beijing) Co., Ltd., Beijing (CN)

(72) Inventor: Jiangtong Tian, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/468,598

(22) Filed: Mar. 24, 2017

(65) Prior Publication Data

US 2018/0095598 A1 Apr. 5, 2018

(30) Foreign Application Priority Data

Sep. 30, 2016 (CN) .......................... 2016 1 0875617

(51) Int. Cl.
*G06F 3/041* (2006.01)

(52) U.S. Cl.
CPC ................................. *G06F 3/0418* (2013.01)

(58) Field of Classification Search
CPC .................................................... G06F 3/0418
USPC ...................................................... 345/173
See application file for complete search history.

(56) References Cited

U.S. PATENT DOCUMENTS

| | | | | |
|---|---|---|---|---|
| 2013/0176257 A1* | 7/2013 | Park | ........................... | G06F 3/01 345/173 |
| 2014/0340321 A1* | 11/2014 | Chang | ................... | G06F 3/0418 345/173 |
| 2017/0277336 A1* | 9/2017 | Yang | ..................... | G06F 3/0416 |

FOREIGN PATENT DOCUMENTS

| | | |
|---|---|---|
| CN | 103309756 A | 9/2013 |
| CN | 103365588 A | 10/2013 |
| CN | 103984433 A | 8/2014 |
| CN | 105631367 A | 6/2016 |

* cited by examiner

*Primary Examiner* — Long D Pham
(74) *Attorney, Agent, or Firm* — Anova Law Group, PLLC

(57) ABSTRACT

An information processing method, an electronic device, and an information processing apparatus are provided. The information processing method comprises determining whether a display output state of a display screen satisfies a first preset condition; in response to the first preset condition being satisfied, controlling a key region to be in a mis-touch avoidance mode; in the mis-touch avoidance mode, in response to a first operation at the key region being detected, determining whether the first operation satisfies a second preset condition; and in response to the second preset condition being satisfied, controlling the key region to be unresponsive to the first operation.

15 Claims, 9 Drawing Sheets

INFORMATION PROCESSING METHOD FOR AVOIDANCE OF A MIS-TOUCH AND ELECTRONIC DEVICE THEREOF

CROSS-REFERENCES TO RELATED APPLICATIONS

This application claims priority of Chinese Patent Application No. 201610875617.7, filed on Sep. 30, 2016, the entire contents of which are hereby incorporated by reference.

FIELD OF THE INVENTION

The present disclosure generally relates to the field of information processing technology and, more particularly, relates to an information processing method, an electronic device, and an information processing apparatus.

BACKGROUND

Currently, development of intelligent terminals progresses very rapidly. Using a smart phone as an example, the display screen of the smart phone becomes increasingly larger, and the key region in the frame or bottom of the display screen becomes smaller and smaller. In particular, the keys in the key region are often capacitive or fingerprint-based touch keys. Under most circumstances, the touch keys in the key region include a backspace key, a home key (also known as home button), and a menu key (also known as menu button), and the three keys facilitate the usage of the smart phone by a user.

However, in certain situations, keys in the key region may easily be touched by mistake (i.e., the keys may be easily mis-touched), thus causing inconvenience in use. For example, when playing a game called Fruit Ninja®, a user may easily touch the menu key when using a finger to swipe and slice a fruit. Once the menu key is triggered, the game may be paused automatically and run in the background, and the smart phone may return to the main menu interface. Such a situation may be frustrating to the user.

The disclosed information processing method, electronic device, and information processing apparatus are directed to solving one or more problems set forth above and other problems.

BRIEF SUMMARY OF THE DISCLOSURE

One aspect of the present disclosure provides an information processing method. The information processing method comprises determining whether a display output state of a display screen satisfies a first preset condition; in response to the first preset condition being satisfied, controlling a key region to be in a mis-touch avoidance mode; in the mis-touch avoidance mode, in response to a first operation at the key region being detected, determining whether the first operation satisfies a second preset condition; and in response to the second preset condition being satisfied, controlling the key region to be unresponsive to the first operation.

Another aspect of the present disclosure provides an electronic device. The electronic device comprises a display screen, a key, a sensor, and a processor. The display screen outputs a display content when in operation. The key is disposed on one side of the display screen. The sensor detects a user operation on the display screen. The processor is coupled to the display screen, the key, and the sensor. The processor determines whether a display output state of the display screen satisfies a first preset condition. In response to the display output state of the display screen satisfying the first preset condition, the processor controls the key region in a mis-touch avoidance mode. In the mis-touch avoidance mode, in response to a first operation towards the key being detected via the sensor, the processor determines whether the first operation satisfies a second preset condition. In response to the second preset condition being satisfied, the processor controls the key to be unresponsive to the first operation.

Another aspect of the present disclosure provides an information processing apparatus. The information processing apparatus includes a first determination module, a first control module, a detection module, a second determination module, and a second control module. The first determination module determines whether a display output state of a display screen satisfies a first preset condition. In response to the first determination module determining that the display output state satisfies the first preset condition, the first control module controls a key region in a mis-touch avoidance mode. In the mis-touch avoidance mode, the detection module detects a first operation at the key region. In response to the detection module detecting the first operation at the key region, the second determination module determines whether the first operation satisfies a second preset condition. In response to the second determination module determining that the first operation satisfies the second preset condition, the second control module controls the key region to be unresponsive to the first operation.

Other aspects of the present disclosure can be understood by those skilled in the art in light of the description, the claims, and the drawings of the present disclosure.

BRIEF DESCRIPTION OF THE DRAWINGS

To make more clearly the explanation of technical solutions in embodiments of the present disclosure, drawings needed in the embodiments are briefly illustrated below. Apparently, the drawings described below only correspond to some embodiments of the present disclosure, and it is possible for those ordinarily skilled in the art to derive other drawings from the accompanying drawings without creative effort.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. The described embodiments are some but not all of the embodiments of the present disclosure. Based on the disclosed embodiments and without inventive efforts, persons of ordinary skill in the art may derive other embodiments consistent with the present disclosure, all of which are within the scope of the present disclosure.

Figure 1:
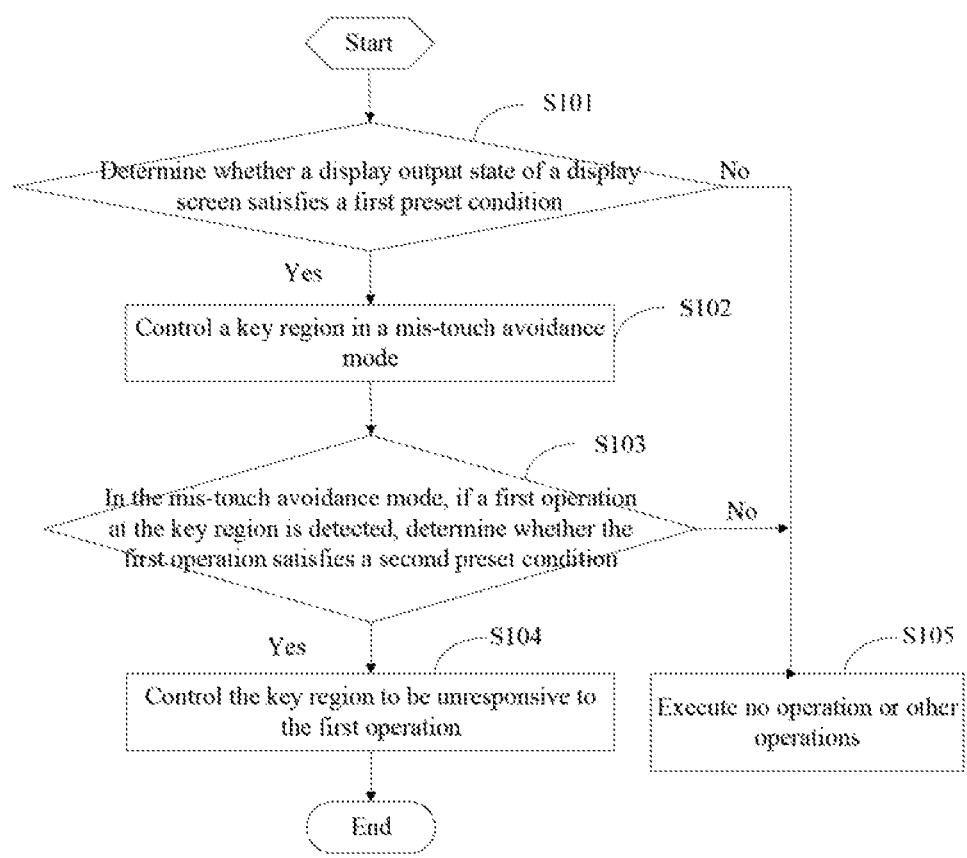
FIG. 1 illustrates a flow chart of an example of an information processing method consistent with the disclosed embodiments.

The present disclosure provides an information processing method applicable to an electronic device. The electronic device may include, but is not limited to, a cell phone, a smart phone, or a tablet, etc. More specifically, the electronic device may include a display screen and a key region on one side of the display screen. FIG. 1 illustrates a flow chart of an exemplary information processing method consistent with the disclosed embodiments. As shown in FIG. 1, the information processing method may include the following steps.

Step S101: Whether a display output state of a display screen satisfies a first preset condition is determined. If the first preset condition is satisfied, Step S102 is executed, and if the first preset condition is not satisfied, Step S105 is executed.

More specifically, the display output state may be a state where a display content of the display screen is in a landscape or portrait orientation, a state where a display content of the display screen is in a full-screen or partial display mode, or a combination thereof, etc. Further, the first preset condition may be, for example, a condition where a display direction of the display content of a display region is a first direction. The first direction may be, for example, a direction from the display screen to the key region.

Step S102: A key region is controlled in a mis-touch avoidance mode.

More specifically, the mis-touch avoidance mode is a mode where mis-touch is avoided. For example, in the mis-touch avoidance mode, the key region may only respond to certain types of touch or press by the user. When the display output state satisfies the first preset condition, it may indicate that, in the electronic device under such a display output state, a user may easily mis-touch the key region. Accordingly, the key region may need to be controlled in the mis-touch avoidance mode.

Step S103: In the mis-touch avoidance mode, if a first operation at the key region is detected, whether the first operation satisfies a second preset condition is determined. If the first operation is determined to satisfy the second preset condition, Step S104 is executed, and if the first operation is determined not satisfying the second preset condition, Step S105 is executed.

More specifically, the first operation may be a touch operation with a relatively small touch pressure, a single-click operation, or a double-click operation showing a short interval time (e.g., 0.3 seconds), etc. The second preset condition may be, for example, a condition where the first operation is a gentle touch with a force or pressure smaller than a preset value.

Step S104: The key region is controlled to be unresponsive to the first operation.

More specifically, when the first operation at the key region satisfies the second preset condition, it indicates that the first operation at the key region is mis-touch. By then, the key region is controlled to be unresponsive to the first operation.

Step S105: No operation is executed or other operations are executed.

More specifically, Step S105 is executed when the first preset condition in Step 101 or the second preset condition in Step 103 is not satisfied. For example, if the display output state of the display screen in Step S101 is determined not satisfying the first preset condition, the key region is not controlled in the mis-touch avoidance mode (i.e., no operation is executed or other operations are executed). For example, in the mis-touch avoidance mode, if the detected first operation detected in Step S103 is determined not satisfying the second preset condition, the key region may not be controlled to be unresponsive to the first operation. That is, the key region may respond to first operation to execute other operations.

Using the disclosed information processing method, when the display output state of the display screen satisfies the first preset condition, the key region may be controlled to be in the mis-touch avoidance mode. In the mis-touch avoidance mode, when a first operation satisfying a second preset condition is detected (i.e., mis-touch of a key in the key region is detected), the key region is controlled to be unresponsive to the first operation.

As such, the information processing method provided by embodiments of the present disclosure may, based on the display output state of the display screen, determine whether or not to control the key region in the mis-touch avoidance mode. In the mis-touch avoidance mode, if a key-press operation in the key region is detected to be mis-touch, response to the operation in the key region may be inhibited. Accordingly, when a user performs an operation based on a current application, the current application may not be paused due to mis-touch on a key. For example, when a user plays a game, the game may no longer be paused automatically and run in the background because a menu button in the key region is mis-touched. That is, the issue of a relatively poor user experience caused by mis-touch on a key in the key region by a user may be avoided.

Based on aforementioned embodiments, the disclosed information processing method may be illustrated in detail with specific embodiments shown as below.

Figure 2:
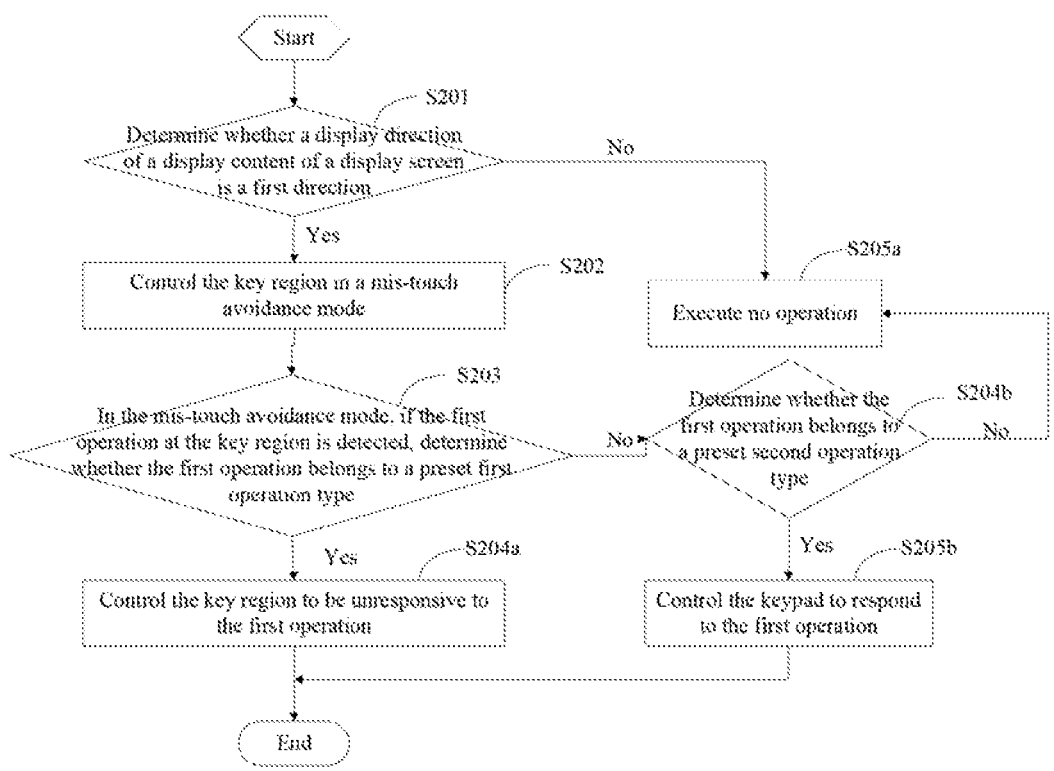
FIG. 2 illustrates a flow chart of another example of an information processing method consistent with disclosed embodiments.

FIG. 2 illustrates a flow chart of another exemplary information processing method consistent with disclosed embodiments. The disclosed information processing method may be applied to an electronic device. The electronic device may be, but not limited to, a cell phone, a smart phone, or a tablet, etc. More specifically, the electronic device may include a display screen, and a key region on one side of the display screen. As shown in FIG. 2, the information processing method may include the following steps.

Step S201: Whether a display direction of a display content of a display screen is a first direction or not is determined. If the display direction of the display content is determined to be the first direction, Step S202 is executed. On the other hand, if the display direction of the display content is determined not to be the first direction, Step S205a is executed.

In particular, the first direction may be a direction parallel to a direction from the display screen to the key region. To determine whether the display direction of the display content on the display screen is the first direction is to determine whether the display content on the display screen is displayed in a landscape orientation.

Step S202: The key region is controlled to be in a mis-touch avoidance mode.

According to the present disclosure, when the display content of the display screen of the electronic device is displayed in the landscape orientation, the key region may be controlled to be in the mis-touch avoidance mode. When the display content on the display screen of the electronic device is displayed in the landscape orientation, if a user performs an operation in a region on the display screen close to the key region, a key in the key region may be mis-touched easily.

For example, when the user uses both hands to hold a cell-phone and play a game, the display output state of the cell-phone may be in the landscape orientation. During a process where the user uses a hand that is close to the key region to play the game, a key in the key region, such as a Home button of the cell-phone, may be easily touched if not enough attention is paid to. Once the Home button is touched, the cell-phone may force the game to be paused automatically and run in the background, and display a main interface of the cell-phone. To avoid the occurrence of such a situation, when the display output state of the cell-phone is determined to be in the landscape orientation, the key region may be controlled to be in the mis-touch avoidance mode.

Step S203: In the mis-touch avoidance mode, if the first operation at the key region is detected, whether the first operation belongs to a preset first operation type is determined. If the first operation is determined to belong to the preset first operation type, Step S204a is executed. On the other hand, if the first operation is determined not belonging to the preset first operation type, step S204b is executed.

For example, an operation belonging to the preset first operation type may be a touch operation with a touch pressure smaller than a preset value. If a key in the key region is mis-touched, the touch pressure of a user finger on the key in the key region is often not very large. That is, the key region is touched gently when an operation is performed on a region of the display screen close to the key region.

Other than the touch operation with a touch pressure smaller than a preset value, the operation of the preset first operation type may also include a single-click operation. However, the present disclosure is not limited thereto. As long as the operation is performed on a region of the display screen close to the key region, any operation in a form that mis-touches the key region belongs to an operation of the first operation type.

Step S204a: The key region is controlled to be unresponsive to the first operation.

Step S204b: Whether the first operation belongs to a preset second operation type is determined. If the first operation is determined to belong to the preset second operation type, Step S205b is executed. On the other hand, if the first operation is determined not belonging to the preset second operation type, Step S205a is executed.

Step S205a: No operation is executed.

Step S205b: The key region is controlled to respond to the first operation.

More specifically, embodiments of the present disclosure may be only unresponsive to the first operation that belongs to the preset first operation type. That is, response to the mis-touch on a key of the key region is inhibited. If the key in the key region is not mis-touched, response to a normal operation on the key of the key region may still be needed. That is, the preset second type operation in the aforementioned steps may be a normal operation performed on the key in the key region, such as a double-click operation on a key in the key region, twice or more gentle touch operations in a predetermined period of time (e.g., 0.3 seconds), a touch pressing operation with a touch pressure greater than the predetermined value, or a touch operation with a touch time longer than a predetermined duration, etc.

In the disclosed information processing method, when the display output state of the display screen satisfies that the display direction of the display content is a first direction (e.g., the display content of the display screen is displayed in the landscape orientation), the key region may be controlled in a mis-touch avoidance mode. In the mis-touch avoidance mode, if the detected first operation belongs to the preset first operation type (i.e., the mis-touch on the key in the key region is detected), the key region is controlled to be unresponsive to the first operation. Further, if the first operation belongs to the preset second operation type (i.e., a normal operation on the key in the key region), the key region is controlled to respond to the first operation.

As such, the disclosed information processing method may determine whether or not to control the key region in the mis-touch avoidance mode based on the display output state of the display screen. In the mis-touch avoidance mode, if an operation on the key in the key region is detected to be mis-touch, response to the operation on the key region is inhibited. Accordingly, when the user performs an operation based on a current application, the current application may not be paused due to the mis-touch on the key in the key region. That is, the issue of a relatively poor user experience caused by mis-touch on a key of the key region by a user may be solved.

Figure 3:
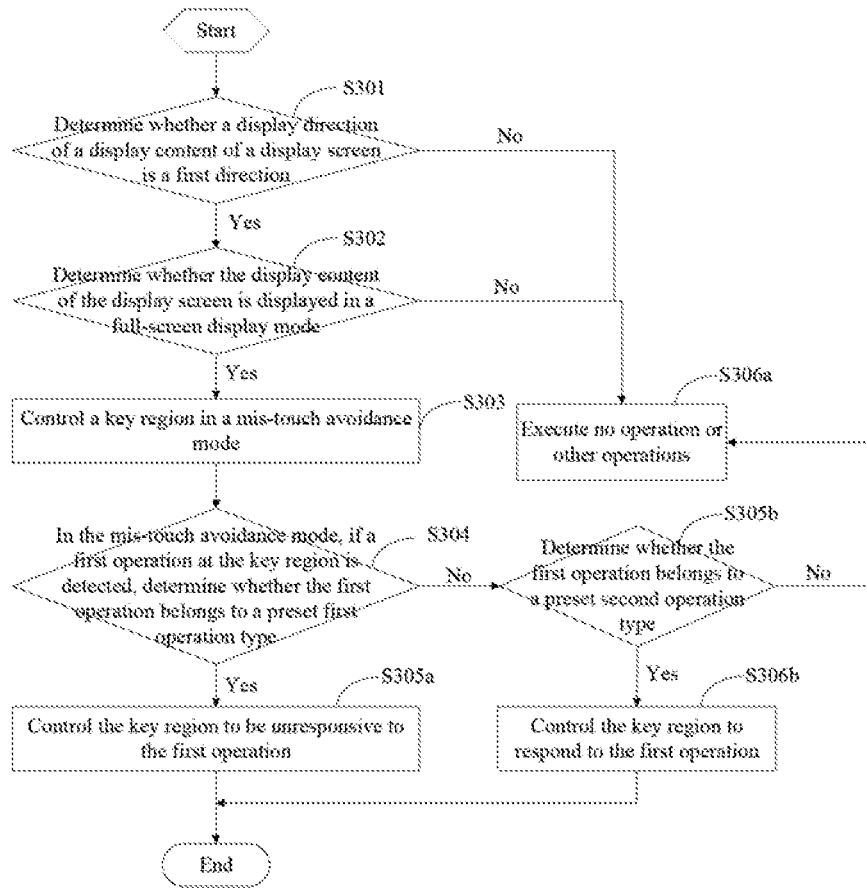
FIG. 3 illustrates a flow chart of another example of an information processing method consistent with disclosed embodiments.

FIG. 3 illustrates a flow chart of another exemplary information processing method consistent with disclosed embodiments. The disclosed information processing method may be applied to an electronic device. The electronic device may be, but not limited to, a cell phone, a smart phone, or a tablet, etc. More specifically, the electronic device may include a display screen, and a key region on one side of the display screen. As shown in FIG. 3, the information processing method may include the following steps.

Step S301: Whether a display direction of a display content of a display screen is a first direction is determined. If the display direction of the display content of the display screen is determined to be the first direction, Step S302 is executed. On the other hand, if the display direction of the display content of the display screen is determined not to be the first direction, Step S306a is executed.

In particular, the first direction may be a direction parallel to a direction from the display screen to the key region. To determine whether the display direction of the display content of the display screen is the first direction is to determine whether the display content on the display screen is in the landscape orientation.

Step S302: Whether the display content of the display screen is in a full-screen display mode is determined. If the display content of the display screen is determined to be in the full-screen display mode, Step S303 is executed. On the other hand, if the display content of the display screen is determined not to be in the full-screen display mode, Step S306a is executed.

Specifically, if information such as a status bar, a progress bar, etc. is not displayed on the display screen, the display content may be indicated to be in a full-screen display mode.

The present disclosure is not intended to limit the implementation order of Step S301 and Step S302. For example, Step S301 may be executed prior to Step S302. Optionally, Step S301 and Step S302 may be executed simultaneously.

Step S303: The key region is controlled in a mis-touch avoidance mode.

Figure 4:
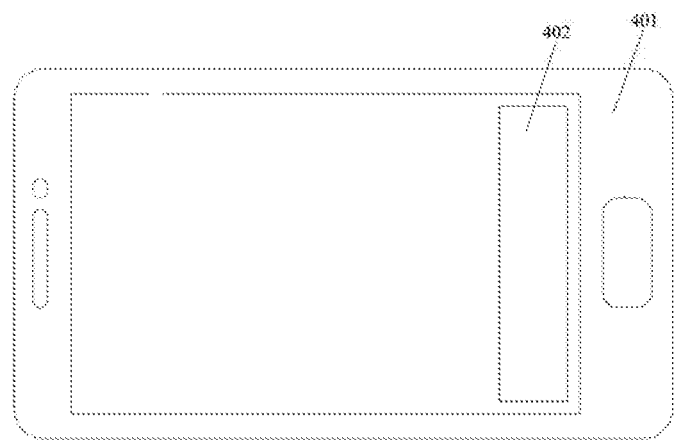
FIG. 4 illustrates a schematic view of a display screen of an example of an electronic device showing a display output state in a landscape orientation and full-screen mode consistent with disclosed embodiments.

For example, FIG. 4 illustrates a schematic view of a display screen of an exemplary electronic device showing a display output state in a landscape orientation and full-screen display mode consistent with disclosed embodiments. When the display content on the display screen of the electronic device is displayed in the landscape orientation and full-screen display mode, the key region may be controlled to be in the mis-touch avoidance mode.

Referring to FIG. 4, when the display content on the display screen of the electronic device is displayed in the landscape orientation and full-screen display mode, if the user performs an operation in a region 402 on the display screen close to a key region 401, a key in the key region 401 may be easily mis-touched. For example, when the user uses both hands to hold a cell-phone and play a game, the display output state of the cell-phone may be a landscape and full-screen display. During a process where a user uses a hand close to the key region to play the game, a key in the key region, such as a Home button of the cell-phone, may be easily touched if not enough attention is paid to. Once the Home button is touched, the cell-phone may force the game to be paused automatically and run in the background, and display a main interface of the cell-phone. To avoid the occurrence of such a situation, when the display output state of the cell-phone is determined to be in the landscape orientation and full-screen display mode, the key region may be controlled to be in the mis-touch avoidance mode.

Step S304: In the mis-touch avoidance mode, if the first operation at the key region is detected, whether the first operation belongs to a preset first operation type is determined. If the first operation is determined to belong to the preset first operation type, Step S305a is executed. Optionally, if the first operation is determined not belonging to the preset first operation type, step S305b is executed.

For example, the preset first operation type may be a touch operation with a touch pressure smaller than a preset value. If a key in the key region is mis-touched, the touch pressure of a user finger on the key in the key region is often not very large. That is, the key region is touched gently when an operation is performed on a region of the display screen close to the key region.

Other than the touch operation with a touch pressure smaller than a preset value, the preset operation of the first operation type may also include a single-click operation. However, the present disclosure is not limited thereto. As long as the operation is performed on a region of the display screen close to the key region, any operation in any form that mis-touches the key region belongs to an operation of the first operation type.

Step S305a: The key region is controlled to be unresponsive to the first operation.

Step S305b: Whether the first operation belongs to a preset second operation type is determined. If the first operation is determined to belong to the preset second operation type, Step S305b is executed. On the other hand, if the first operation is determined not belonging to the preset second operation type, Step S306a is executed.

Step S306a: No operation is executed or other operations are executed.

Step S306b: The key region is controlled to respond to the first operation.

More specifically, embodiments of the present disclosure may be only unresponsive to the first operation that belongs to the preset first operation type. That is, response to the mis-touch on a key of the key region is inhibited. If the key in the key region is not mis-touched, response to a normal operation on the key of the key region may still be needed. That is, the preset second type operation in the aforementioned steps may be a normal operation performed on the key in the key region, such as a double-click operation on the key in the key region, twice or more gentle touch operations in a predetermined period of time (e.g., 0.3 seconds), a touch pressing operation with a touch pressure greater than a predetermined value, or a touch operation with a touch time longer than a predetermined duration, etc.

In the disclosed information processing method, when the display output state of the display screen satisfies that the display direction of the display content is a first direction (e.g., the display content of the display screen is displayed in a landscape orientation) and the display content is displayed in full-screen mode, the key region may be controlled in a mis-touch avoidance mode. In the mis-touch avoidance mode, if the detected first operation belongs to the preset first operation type (i.e., the mis-touch on the key in the key region is detected), the key region is controlled to respond to the first operation. If the first operation belongs to the preset second operation type (i.e., the normal operation on a key in the key region), the key region may be controlled to respond to the first operation.

As such, the disclosed information processing method may determine whether or not to control the key region in the mis-touch avoidance mode based on the display output state of the display screen. In the mis-touch avoidance mode, if the operation on the key in the key region is detected to be mis-touch, the operation responding to the key region is inhibited. Accordingly, when the user performs an operation based on a current application, the current application may not be paused due to the mis-touch on the key in the key region. That is, the issue of a relatively poor user experience caused by mis-touch on a key of the key region by a user may be solved.

The aforementioned descriptions illustrate a first type of situations where a user mis-touches a key in the key region when the display content of the display screen is displayed in a full-screen display mode, or a landscape orientation, or a combination thereof. Other than such situations, a second type of situations also exist, where a user mis-touches a key in the key region when the display interface of the display screen includes a pre-configured region configured to receive a user operation and a distance between the pre-configured region and the key region is shorter than a predetermined distance. Towards the second type of situations, the present disclosure provides a specific solution to avoid mis-touch.

Figure 5:
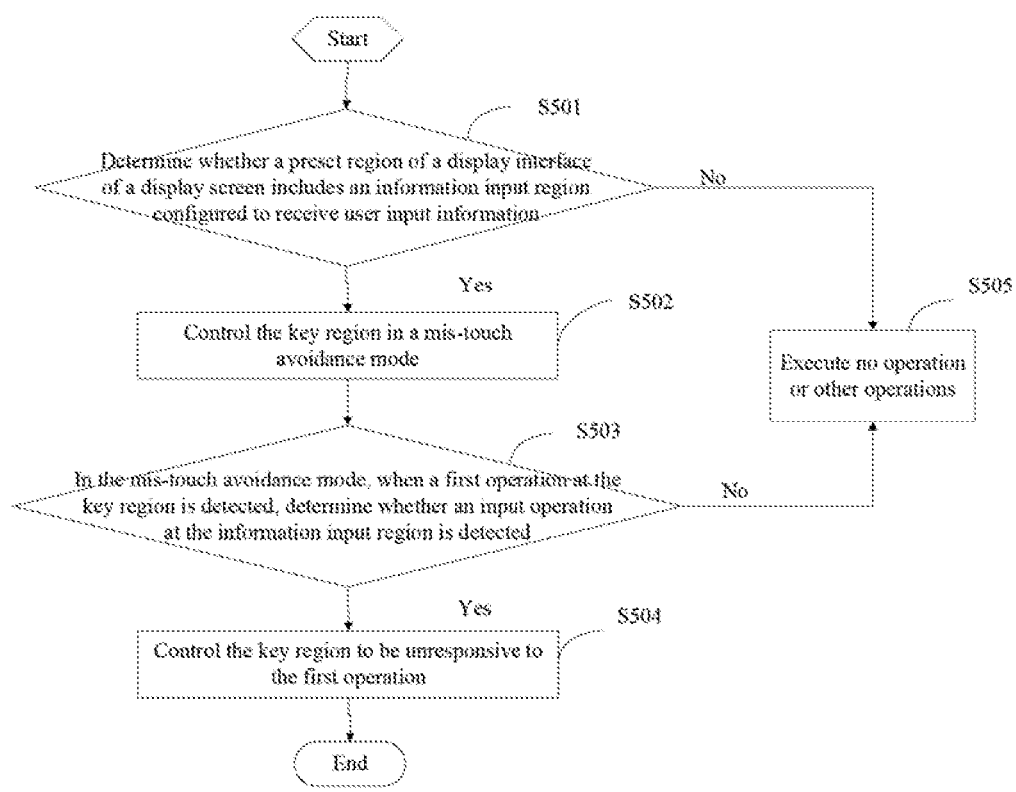
FIG. 5 illustrates a flow chart of another example of an information processing method consistent with disclosed embodiments.

FIG. 5 illustrates a flow chart of another exemplary information processing method consistent with disclosed embodiments. The disclosed information processing method may be applied to an electronic device. The electronic device may be, but not limited to, a cell phone, a smart phone, or a tablet, etc. More specifically, the electronic device may include a display screen, and a key region on one side of the display screen. As shown in FIG. 5, the information processing method may include the following steps.

Step S501: Whether a preset region of a display interface of a display screen includes an information input region configured to receive user input is determined. If the preset region of the display interface of the display screen is determined to include the information input region configured to receive user input, Step S502 is executed. If the preset region of the display interface of the display screen is determined not to include the information input region configured to receive user input, Step S505 is executed. In particular, the preset region is a region with a shorter distance towards the key region than a preset distance.

Step S502: The key region is controlled in the mis-touch avoidance mode.

Figure 6:
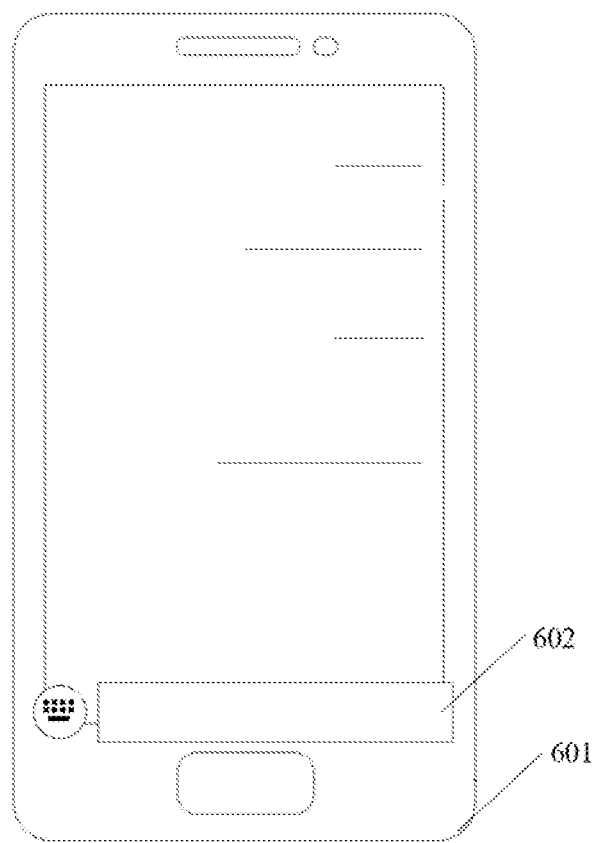
FIG. 6 illustrates a schematic view of a display interface of a display screen of an example of an electronic device including an input region consistent with disclosed embodiments.

FIG. 6 illustrates a schematic view of a display interface of a display screen of an exemplary electronic device including an input region consistent with disclosed embodiments. Referring to FIG. 6, a display interface of the display screen is illustrated. The display interface may include a key region 601 and an information input region 602.

When the user performs information input in the information input region 602, the key region 601 may be mis-touched easily. For example, when the user performs information input in the information input region 602, if the Home button in the key region 601 is mis-touched, the current display interface may highly likely be switched to the background, thereby displaying the main interface of the electronic device. To avoid the occurrence of the above-described situations and ensure that the information input of the user is not interrupted due to mis-touch, when the preset region of the display interface of the display screen is determined to include the information input region, the key region may be controlled in the mis-touch avoidance mode.

Step S503: In the mis-touch avoidance mode, when a first operation at the key region is detected, whether an input operation at the information input region is detected is determined. If the input operation at the information input region is detected, Step 504 is executed. On the other hand, if the input operation at the information input region is not detected, Step S505 is executed.

When the first operation at the key region is detected, a detection of an input operation at the information input region may indicate that the user touches the key region when perform information input in the information input region.

Step S504: The key region is controlled to be unresponsive to the first operation.

Step S505: no operation is executed or other operations are executed.

Using the WeChat® application as an example to illustrate the aforementioned process. Assuming that the display interface of the display screen is a chat interface with a contact person, the chat interface may include a chat history with the contact person, and an information input box. The information input box may be close to the key region, and the user may perform information input in the information input box. When the electronic device detects that the preset region in the chat interface that shows a distance to the key region shorter than the preset distance includes the information input box, the key region may be controlled to be in the mis-touch avoidance mode.

After the key region is in the mis-touch avoidance mode, when an operation at the key region is detected, if an input operation in the information input box is detected, the operation on the key in the key region may be determined to be a mis-touch operation, and response to the operation on a key in the key region may be inhibited. Accordingly, the input operation of the user may not be interrupted due to mis-touch on the key.

In the mis-touch avoidance mode, when the first operation at the key region is detected, if input operation towards the information input region is not detected, whether or not the first operation belongs to the preset second type operation may be determined. If the first operation is determined to belong to the preset second type operation, the key region is controlled to respond to the first operation. Otherwise, if the first operation is determined not belonging to the preset second type operation, no operation is executed.

In particular, the preset second type operation may be a normal operation on the key in the key region, such as a double-click operation on the key in the key region, twice or more gentle touch operation in a predetermined period of time, a touch pressing operation with a touch pressure greater than a predetermined value, or a touch operation with a touch time longer than a predetermined duration, etc.

In the disclosed information processing method, when the preset region of the display interface of the display screen includes an information input region, the key region is controlled to be in a mis-touch avoidance mode. In the mis-touch avoidance mode, when an input operation at the information input region is detected, if a touch operation on the key in the key region is detected, the key region may be controlled to be unresponsive to the touch operation on the key in the key region.

As such, the disclosed information processing method may determine whether or not to control the key region in the mis-touch avoidance mode based on the display output state of the display screen. In the mis-touch avoidance mode, if the operation on the key in the key region is detected to be mis-touch, response to the operation in the key region may be inhibited. Accordingly, when the user performs an operation based on a current application, the current application may not be paused due to the mis-touch on the key region. That is, the issue of a relatively poor user experience caused by mis-touch on a key of the key region by a user may be solved.

Figure 7:
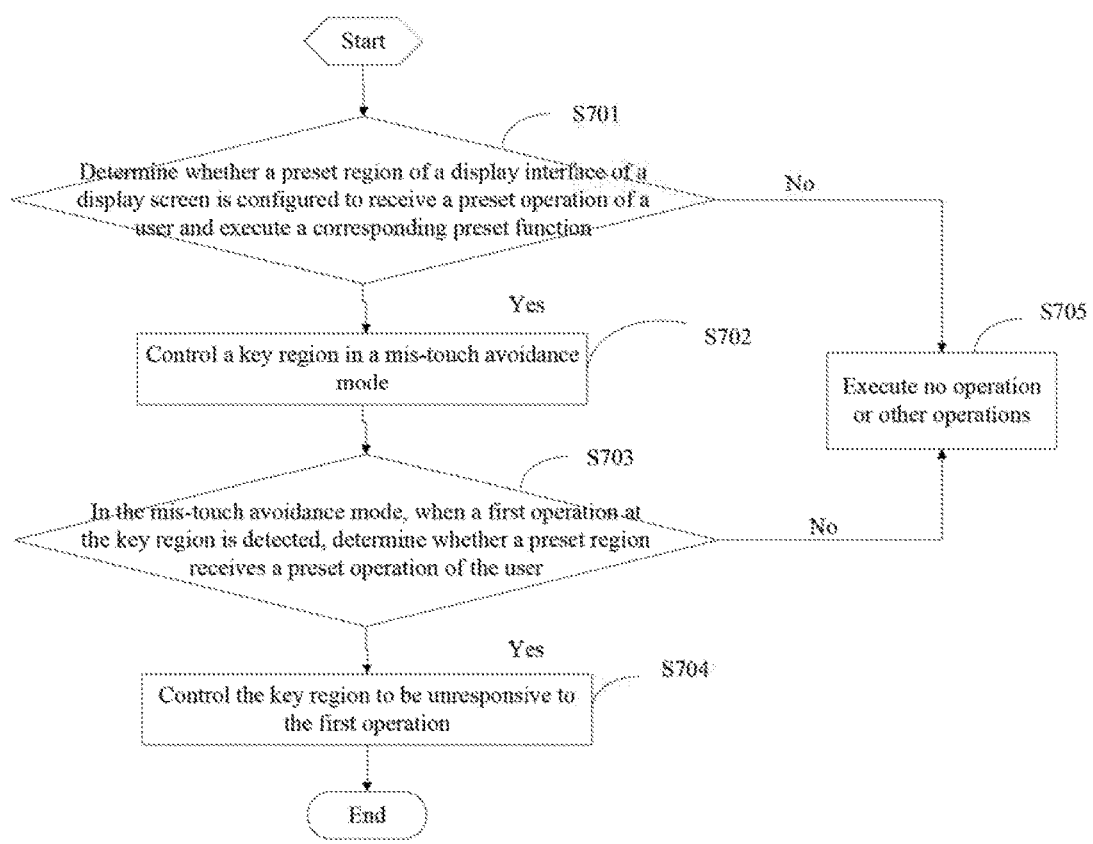
FIG. 7 illustrates a flow chart of another example of an information processing method consistent with disclosed embodiments.

FIG. 7 illustrates a flow chart of another exemplary information processing method consistent with disclosed embodiments. The disclosed information processing method may be applied to an electronic device. The electronic device may be, but not limited to, a cell phone, a smart phone, or a tablet, etc. More specifically, the electronic device may include a display screen, and a key region on one side of the display screen. As shown in FIG. 7, the information processing method may include the following steps.

Step S701: Whether a preset region of a display interface of a display screen is configured to receive a preset operation of a user thus executing a corresponding preset function is determined. If the preset region of the display interface of the display screen is determined to receive the preset operation of the user thus executing the corresponding preset function, Step S702 is executed. If the preset region of the display interface of the display screen is determined not to receive the preset operation of the user thus executing the corresponding preset function, Step S704 is executed.

In particular, the preset region is a region with a shorter distance towards the key region than a preset distance.

Step S702: The key region is controlled in a mis-touch avoidance mode.

Figure 8:
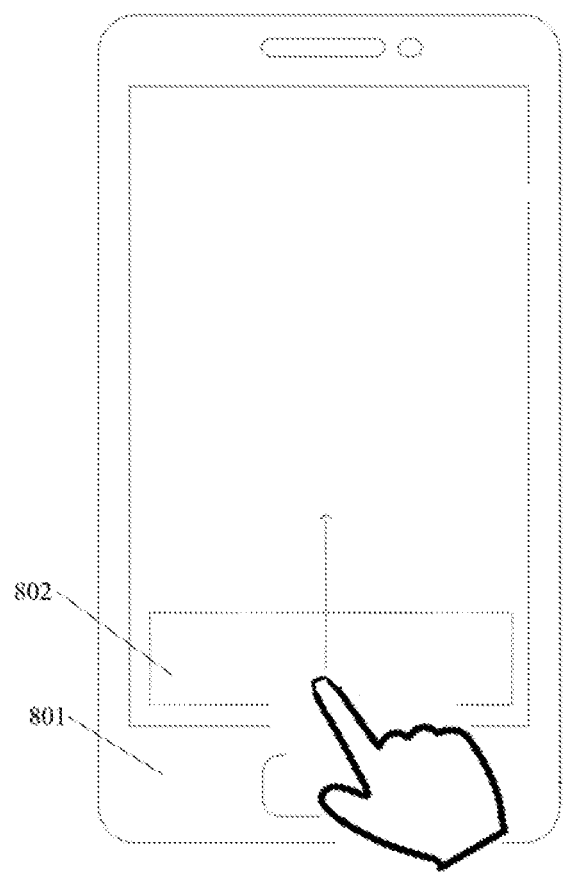
FIG. 8 illustrates a schematic view of a display interface of a display screen of an example of an electronic device including a preset region consistent with disclosed embodiments.

FIG. 8 illustrates a schematic view of a display interface of a display screen of an exemplary electronic device including a preset region consistent with disclosed embodiments. As shown in FIG. 8, a display interface of a display screen is illustrated, and the display interface includes a key region 801, and a preset region 802 close to the key region 801. The preset region 802 may receive a preset operation to execute a preset function.

For example, the preset region 802 may receive a touch swipe gesture swiping upwards from the bottom of the display screen, thus opening the control panel. Further, for example, the preset region 802 may receive a touch swipe gesture swiping upwards from the bottom of the display screen, thereby opening an icon display interface of commonly used applications to conveniently and rapidly trigger certain applications.

If the user performs an operation at the preset region 802 close to the key region 801, a key in the key region may be easily mis-touched (e.g., a key in the lower portion of the display screen may be highly likely mis-touched when swiping upwards from the bottom of the display screen or when other swipe gestures are used), and the mis-touch on the key in the key region may highly likely result in functions corresponding to operations not being executed (e.g., the control panel cannot be opened). To avoid the occurrence of such situations, when the display interface of the display screen is detected to include a preset region configured to receive a preset operation of the user, thereby executing a corresponding preset function, embodiments of the present disclosure control the key region in a mis-touch avoidance mode. The information processing method further includes the following steps.

Step S703: In the mis-touch avoidance mode, when the first operation at the key region is detected, whether the preset region receives a preset operation by a user is determined. If the preset region is determined to have received the preset operation by the user, Step S704 is executed. If the preset region is determined not having received the preset operation by the user not, Step S705 is executed.

When the first operation at the key region is detected, if the preset region receives the preset operation by the user, the user is indicated to have touched the key region when performing an operation at the preset region.

Step S704: The key region is controlled to be unresponsive to the first operation.

Step S705: no operation is executed or other operations are executed.

In the mis-touch avoidance mode, when the first operation at the key region is detected, if the preset region receives no preset operation of the user, whether or not the first operation belongs to the preset second type operation may be determined. If the first operation is determined to belong to the preset second type operation, the key region is controlled to respond to the first operation. Otherwise, if the first operation is determined not belonging to the preset second type operation, no operation is executed.

In particular, the preset second type operation may perform a normal operation on the key in the key region, such as a double-click operation on the key in the key region, twice or more gentle touch operations in a predetermined period of time, a touch pressing operation with a touch pressure greater than a predetermined value, or a touch operation with a touch time longer than a predetermined duration, etc.

In the disclosed information processing method, when the display interface of the display screen includes a preset region showing a distance towards the key region shorter than the preset distance, where the preset region is configured to receive a preset operation of the user and thus to execute a corresponding preset function, the key region is controlled to be in a mis-touch avoidance mode. In the mis-touch avoidance mode, when a first operation at the key region is detected, if the preset region receives the preset operation of the user, the key region is controlled to be unresponsive to the first operation on the key in the key region.

As such, the disclosed information processing method may determine whether or not to control the key region in the mis-touch avoidance mode based on the display output state of the display screen. In the mis-touch avoidance mode, if the operation on the key in the key region is detected to be mis-touch, response to the operation in the key region may be inhibited. Accordingly, when the user performs an operation based on a current application, the current application may not be paused due to the mis-touch on the key in the key region. That is, the issue of a relatively poor user experience caused by mis-touch on a key in the key region by a user may be avoided.

Figure 9:
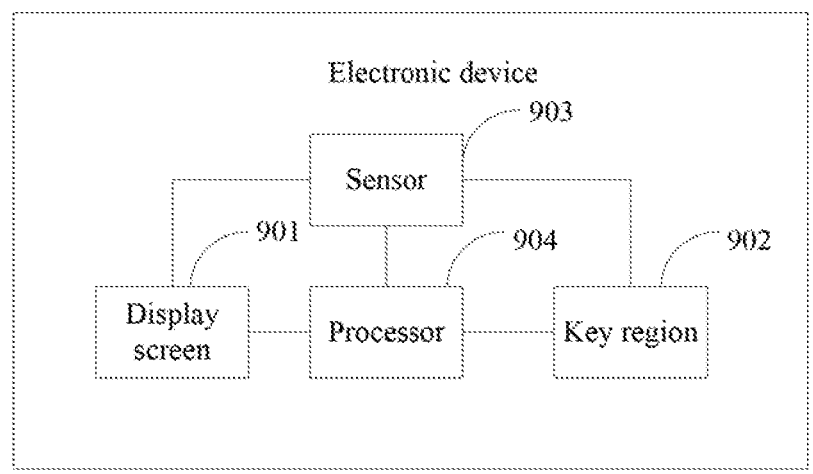
FIG. 9 illustrates a structural diagram of an example of an electronic device consistent with disclosed embodiments.

FIG. 9 illustrates a structural diagram of an exemplary electronic device consistent with disclosed embodiments. As shown in FIG. 9, the electronic device may include a display screen 901, a key region 902, a sensor 903, and a processor 904. The display screen 901 is configured to output display content. The key region 902 is disposed on one side of the display screen 901 and may include one key or a plurality of keys. Optionally, the key region 902 may be in a physical state or a virtual state. The sensor 903 is configured to detect a user operation.

The processor 904 is configured to determine whether a display output state of the display screen 901 satisfies a first preset condition or not. If the display output state of the display screen satisfies the first preset condition, the key region may be controlled to be in a mis-touch avoidance mode. In the mis-touch avoidance mode, when a first operation at the key region 902 is detected via the sensor 903, whether the first operation satisfies a second preset condition may be determined. If the second preset condition is satisfied, the key region 902 may be controlled to be unresponsive to the first operation.

The disclosed electronic device may control the key region in a mis-touch avoidance mode when the display output state of the display screen satisfies the first preset condition. In the mis-touch avoidance mode, when a first operation satisfying the second preset condition is detected (i.e., a mis-touch on the key region is detected), the key region may be controlled to be unresponsive to the first operation.

As such, the disclosed electronic device may determine whether or not to control the key region in a mis-touch avoidance mode based on the display output state of the display screen. In the mis-touch avoidance mode, if the operation at the key region is detected to be mis-touch, response to the operation at the key region may be inhibited. Accordingly, when the user performs an operation based on the current application, the current application may not be paused due to mis-touch on the key region (e.g., when the user plays a game, the game may not be automatically paused and run in the background due to mis-touch on a menu button). Thus, the issue of a relatively poor user experience caused by mis-touch on the key by the user may be solved.

In one embodiment, the processor in the disclosed electronic device is specifically configured to, when the display direction of the display content of the display screen is a first direction, determine whether the display output state satisfies the first preset condition. In particular, the first direction is parallel to the direction from the display screen to the key region.

In another embodiment, the processor in the disclosed electronic device may be specifically configured to, when the display direction of the display content of the display screen is a first direction and the display content is displayed in a full-screen display mode, determine whether the display output state satisfies the first preset condition. In particular, the first direction is parallel to the direction from the display screen to the key region.

Correspondingly, the processor in the disclosed electronic device is specifically configured to, when the first operation belongs to the preset first operation type, determine whether the first operation satisfies the second preset condition.

In another embodiment, the processor in the disclosed electronic device is specifically configured to determine whether the preset region of the display interface of the display screen is configured to receive a user operation or not. If the preset region of the display interface of the display screen is determined to be configured to receive the user operation, the display output state is determined to satisfy the first preset condition. In particular, the distance between the preset region and the key is shorter than a preset distance.

Based on aforementioned embodiments, in another embodiment, the processor is specifically configured to when the preset region of the display interface includes an information input region configured to receive an input operation of the user, determine that the display output state satisfies the first preset condition. Further, when the first operation towards the key-press is detected, the processor is configured to determine whether or not an input operation at the information input region is detected. If the input operation at the information input region is detected, the first operation may be determined to satisfy the second preset condition.

Based on the aforementioned embodiments, in another embodiment, the processor is specifically configured to, when the preset region of the display interface is configured to receive a preset operation of a user, thereby executing a corresponding preset function, determine that the display output state satisfies the first preset condition. Further, when the first operation at the key region is detected, the processor is configured to determine whether the preset region receives the preset operation of the user or not. If the preset region is determined to receive the preset operation of the user, the first operation may be determined to satisfy the second preset condition.

The processor in the disclosed electronic device may further be configured to, when the first operation fails to satisfy the second preset condition, determine whether the first operation belongs to the preset second operation type or not. If the first operation is determined to belong to the preset second operation type, the key region may be controlled to respond to the first operation.

Figure 10:
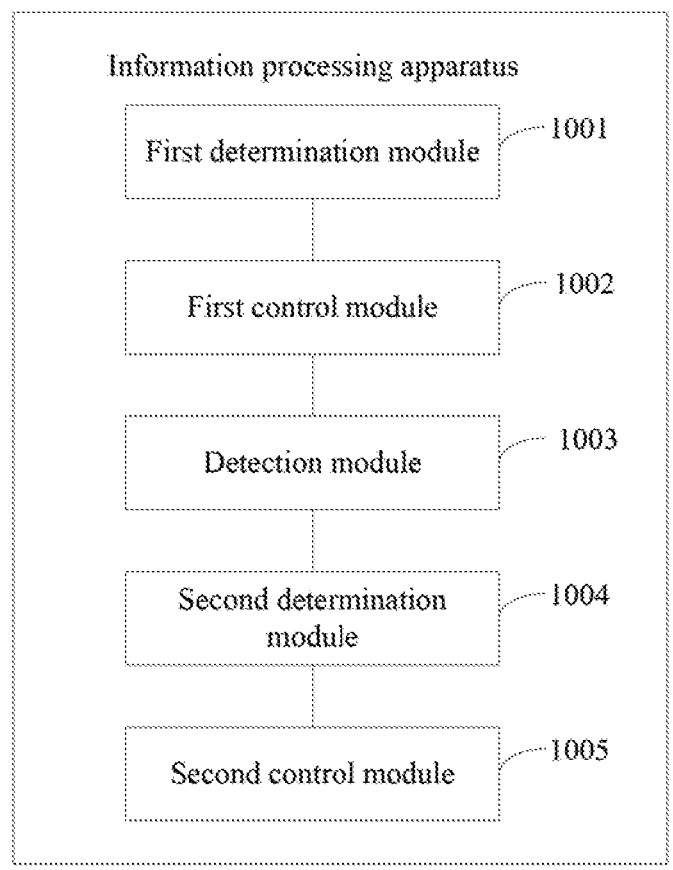
FIG. 10 illustrates a structural diagram of an example of an information processing apparatus consistent with disclosed embodiments.

FIG. 10 illustrates a structural diagram of an exemplary information processing apparatus consistent with disclosed embodiments. As shown in FIG. 10, the present disclosure also provides an information processing apparatus applicable to an electronic device. The electronic device may include a display screen and a key region disposed on one side of the display screen. The information processing apparatus may include a first determination module 1001, a first control module 1002, a detection module 1003, a second determination module 1004, and a second control module 1005.

The first determination module 1001 may be configured to determine whether a display output state of a display screen satisfies a first preset condition or not. The first control module 1002 may be configured to, when the first determination module 1001 determines that the display output state satisfies the first preset condition, control the key region to be in a mis-touch avoidance mode.

Further, the detection module 1003 may be configured to, in the mis-touch avoidance mode, detect a first operation at the key region. The second determination module 1004 may be configured to, when the detection module 1003 detects the first operation at the key region, determine whether the first operation satisfies the second preset condition. The second control module 1005 may be configured to, when the second determination module 1004 determines that the first operation satisfies the second preset condition, control a key region to be unresponsive to the first operation.

The disclosed information processing apparatus may control the key region in a mis-touch avoidance mode when the display output state of the display screen satisfies the first preset condition. In the mis-touch avoidance mode, when the first operation satisfying the second preset condition is detected (i.e., a mis-touch on the key in the key region is detected), the information processing apparatus controls the key region to be unresponsive to the first operation.

As such, the disclosed information processing method may determine whether or not to control the key region in a mis-touch avoidance mode based on the display output state of the display screen. In the mis-touch avoidance mode, if the operation on the key in the key region is detected to be mis-touch, the response to the operation at the key region may be inhibited.

Accordingly, when the user performs an operation based on the current application, the current application may not be paused due to mis-touch on the key (e.g., when the user plays a game, the game may not be automatically paused and run in the background due to mis-touch on the menu button). Thus, the issue of a relatively poor user experience caused by mis-touch on the key by the user may be solved.

In one embodiment, the first determination module 1001 in the disclosed information processing apparatus is specifically configured to, when a display direction of the display content of the display screen is a first direction, determine whether the display output state satisfies the first preset condition. In particular, the first direction is parallel to the direction from the display screen to the key region.

In another embodiment, the first determination module in the disclosed information processing apparatus may be specifically configured to, when the display direction of the display content of the display screen is a first direction and the display content is in a full-screen display mode, determine whether the display output state satisfies the first preset condition. In particular, the first direction is parallel to the direction from the display screen to the key region.

Correspondingly, the second determination module 1003 in the disclosed information processing apparatus is specifically configured to when the first operation belongs to a preset first operation type, determine that the first operation satisfies the second preset condition.

In another embodiment, the first determination module 1001 in the disclosed information processing module is specifically configured to, when the preset region of the display interface includes an information input region configured to receive an input operation of the user, determine that the display output state satisfies the first preset condition. Correspondingly, the second determination module 1003 is specifically configured to when the first operation at the key region is detected, determine whether an input operation towards the information input region is detected or not. If the input operation towards the information input region is detected, the first operation may be determined to satisfy the second preset condition.

In another embodiment, the first determination module 1001 is specifically configured to, when the display interface includes a preset region configured to receive a preset operation of the user, thereby executing a corresponding function, determine that the display output state satisfies the first preset condition. Correspondingly, the second determination module 1003 is specifically configured to, when the first operation at the key region is detected, determine whether the preset region receives a preset operation of the user. If the preset region is determined to receive the preset operation of the user, the first operation is determined to satisfy the second preset condition.

The aforementioned information processing apparatus may further include a third determination module and a third control module. In particular, the third determination module may be configured to, when the first operation fails to satisfy the second preset condition, determine whether the first operation belongs to a preset second operation type. The third control module may be configured to, when the third determination module determines that the first operation does not belong to the preset second operation type, control the key region to respond to the first operation.

Various embodiments of the present specification are described in a progressive manner, in which each embodiment focusing on aspects different from other embodiments, and the same and similar parts of each embodiment may be referred to each other. Because the disclosed devices correspond to the disclosed methods, the description of the disclosed devices and the description of the disclosed methods may be read in combination or in separation.

In various embodiments of the present disclosure, it should be understood that the disclosed device and method may be implemented by other manners. The device described above is merely for illustrative. For example, the units may be merely partitioned by logic function. In practice, other partition manners may also be possible. For example, various units or components may be combined or integrated into another system, or some features may be omitted or left unexecuted. In addition, mutual coupling, direct coupling, or communication displayed or discussed herein may be indirect coupling or communication connection in electrical, mechanical, or other forms through some interfaces, apparatus, or units.

Units described as separated components may or may not be physically separated, and the components serving as display units may or may not be physical units. That is, the components may be located at one position or may be distributed over various network units. Optionally, some or all of the units may be selected to realize the purpose of solutions of embodiments herein according to practical needs.

Further, the various functional units of various embodiments of the invention may be integrated into one processing unit, or may present individually. Two or more units may be integrated into one unit. The integrated unit may be realized in a hardware form, or in a form combining the hardware and software functional units.

Those ordinarily skilled in the art may understand that all or a part of the steps of the above embodiments may be realized via hardware relevant to the program demands, and previous programs may be stored in computer readable storage media. When the program is being executed, the steps of the above embodiments may be executed. The storage media described above may include portable storage device, Read-Only Memory (ROM), Random Access Memory (RAM), a magnetic disc, an optical disc or any other media that may store program codes.

When the described functions are implemented as software function units, and are sold or used as independent products, they may be stored in a computer accessible storage medium. Based on such understanding, the technical solutions of the present disclosure, or the portions contributing to the prior art may be embodied in the form of a software product. The computer software product may be stored in a storage medium, and include several instructions to instruct a computer device (e.g., a personal computer, a server, or a network device) to execute all or some of the method steps of each embodiment. The storage medium described above may include portable storage device, ROM, RAM, a magnetic disc, an optical disc or any other media that may store program codes.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An information processing method, comprising:
    determining whether a display output state of a display screen satisfies a first preset condition, including:
        in response to a display direction of a display content of the display screen being a first direction, determining that the display output state satisfies the first preset condition, the first direction being substantially parallel to a direction from the display screen to a key region;
    in response to the first preset condition being satisfied, controlling the key region to be in a mis-touch avoidance mode;
    in the mis-touch avoidance mode, in response to a first operation at the key region being detected, determining whether the first operation satisfies a second preset condition; and
    in response to the second preset condition being satisfied, controlling the key region to be unresponsive to the first operation.

2. The method according to claim 1, wherein determining whether the first operation satisfies the second preset condition comprises:
    in response to the first operation belonging to a preset first operation type, determining that the first operation satisfies the second preset condition.

3. The method according to claim 2, further comprising:
    in response to the second preset condition not being satisfied, determining whether the first operation belongs to a preset second operation type, and
    in response to the first operation belonging to the preset second operation type, controlling the key region to respond to the first operation.

4. The method according to claim 1, wherein determining whether the display output state of the display screen satisfies the first preset condition comprises:
    in response to the display direction of the display content of the display screen being the first direction and the display content being in a full-screen display mode, determining that the display output state satisfies the first preset condition.

5. The method according to claim 1, wherein determining whether the display output state satisfies the first preset condition comprises:
 determining whether a preset region of a display interface of the display screen receives a user operation, and
 in response to the preset region of the display interface of the display screen receiving the user operation, determining that the display output state satisfies the first preset condition,
 wherein a distance between the preset region and the key region is shorter than a predetermined distance.

6. The method according to claim 5, wherein determining whether the display output state satisfies the first preset condition comprises:
 in response to the preset region of the display interface including an information input region to receive a user input operation, determining that the display output state satisfies the first preset condition; and
 determining whether the first operation satisfies the second preset condition comprises:
  in response to the first operation at the key region being detected, determining whether an input operation towards the information input region is detected, and
  in response to the input operation towards the information input region being detected, determining that the first operation satisfies the second preset condition.

7. The method according to claim 5, wherein determining whether the display output state satisfies the first preset condition comprises:
 in response to the preset region of the display interface receiving a preset operation of a user, thereby executing a corresponding preset function, determining that the display output state satisfies the first preset condition; and
 determining whether the first operation satisfies the second preset condition comprises:
  in response to the first operation at the key region being detected, determining whether the preset region receives the preset operation of the user, and
  in response to the preset region receiving the preset operation of the user, determining that the first operation satisfies the second preset condition.

8. An electronic device, comprising:
 a display screen, wherein the display screen outputs a display content when in operation;
 a key region disposed on one side of the display screen;
 a sensor, wherein the sensor detects a user operation on the display screen; and
 a processor coupled to the display screen, the key region, and the sensor,
 wherein:
  the processor determines whether a display output state of the display screen satisfies a first preset condition, and determines that the display output state satisfies the first preset condition in response to a display direction of a display content of the display screen being a first direction, the first direction being substantially parallel to a direction from the display screen to the key region,
  in response to the display output state of the display screen satisfying the first preset condition, the processor controls the key region in a mis-touch avoidance mode,
  in the mis-touch avoidance mode, when a first operation at the key region is detected via the sensor, the processor determines whether the first operation satisfies a second preset condition, and
  in response to the second preset condition being satisfied, the processor controls the key region to be unresponsive to the first operation.

9. The electronic device according to claim 8, wherein:
in response to the first operation belonging to a preset first operation type, the processor determines that the first operation satisfies a second preset condition.

10. The electronic device according to claim 9, wherein:
in response to the first operation not satisfying the second preset condition, the processor determines whether the first operation belongs to a preset second operation type, and in response to the first operation satisfying the second preset condition, the processor controls the key region to respond to the first operation.

11. The electronic device according to claim 8, wherein:
the processor determines whether a preset region of a display interface of the display screen receives a user operation, and
in response to the preset region of the display interface of the display screen receiving the user operation, the processor determines that the display output state satisfies the first preset condition,
wherein a distance between the preset region and the key region is shorter than a predetermined distance.

12. The electronic device according to claim 11, wherein:
in response to the preset region of the display interface including an information input region to receive a user input operation, the processor determines that the display output state satisfies the first preset condition, and
in response to the first operation towards the key region being detected, the processor determines whether an input operation towards the information input region is detected, and in response to the input operation towards the information input region being detected, the processor determines that the first operation satisfies the second preset condition.

13. The electronic device according to claim 11, wherein:
in response to the preset region of the display interface receiving a preset operation of a user and thus to execute a corresponding preset function, the processor determines that the display output state satisfies the first preset condition, and
in response to the first operation at the key region being detected, the processor determines whether the preset region receives the preset operation of the user, and in response to the preset region receiving the preset operation of the user, the processor determines that the first operation satisfies the second preset condition.

14. The electronic device according to claim 8, wherein:
in response to the display direction of the display content of the display screen being the first direction and the display content being displayed in a full-screen display mode, the processor determines that the display output state satisfies the first preset condition.

15. An information processing apparatus, comprising:
a processor; and
a storage medium storing instructions to instruct the processor to:
 determine whether a display output state of a display screen satisfies a first preset condition, including:
  in response to a display direction of a display content of the display screen being a first direction, determining that the display output state satisfies the first preset condition, the first direction being substantially parallel to a direction from the display screen to a key region;
in response to the first preset condition being satisfied, control the key region to be in a mis-touch avoidance mode;
in the mis-touch avoidance mode, in response to a first operation at the key region being detected, determine whether the first operation satisfies a second preset condition; and
in response to the second preset condition being satisfied, control the key region to be unresponsive to the first operation.

* * * * *